United States Patent
Yhr

(10) Patent No.: US 10,942,497 B2
(45) Date of Patent: Mar. 9, 2021

(54) METHOD AND ARRANGEMENT FOR PROVIDING REDUNDANCY IN A VEHICLE ELECTRICAL CONTROL SYSTEM

(71) Applicant: VOLVO TRUCK CORPORATION, Gothenburg (SE)

(72) Inventor: Hamid Yhr, Gråbo (SE)

(73) Assignee: Volvo Truck Corporation, Gothenburg (SE)

( * ) Notice: Subject to any disclaimer, the term of this patent is extended or adjusted under 35 U.S.C. 154(b) by 302 days.

(21) Appl. No.: 15/557,145

(22) PCT Filed: Mar. 24, 2016

(86) PCT No.: PCT/EP2016/056560
§ 371 (c)(1),
(2) Date: Sep. 11, 2017

(87) PCT Pub. No.: WO2016/156204
PCT Pub. Date: Oct. 6, 2016

(65) Prior Publication Data
US 2018/0046161 A1    Feb. 15, 2018

Related U.S. Application Data

(63) Continuation-in-part of application No. PCT/EP2015/056847, filed on Mar. 30, 2015.

(51) Int. Cl.
G05B 19/042 (2006.01)
G05B 9/03 (2006.01)
B60W 50/023 (2012.01)

(52) U.S. Cl.
CPC ....... *G05B 19/0425* (2013.01); *B60W 50/023* (2013.01); *G05B 9/03* (2013.01);
(Continued)

(58) Field of Classification Search
None
See application file for complete search history.

(56) References Cited

U.S. PATENT DOCUMENTS 5,583,844 A    12/1996 Wolf et al.
6,061,600 A    5/2000 Ying
(Continued)

FOREIGN PATENT DOCUMENTS

CN    102736538 A    10/2012
CN    103902862 A    5/2014
(Continued)

OTHER PUBLICATIONS

International Search Report (dated Jul. 5, 2016) for corresponding International App. PCT/EP2016/056560.
(Continued)

*Primary Examiner* — Aniss Chad
*Assistant Examiner* — Mahmoud M Kazimi
(74) *Attorney, Agent, or Firm* — WRB-IP LLP

(57) ABSTRACT

An arrangement is provided for providing redundancy in a vehicle electrical control system, including a plurality of electronic control units connected to each other through a first data bus, and where each electronic control unit is connected to one or more I/O-units through a separate second data bus, where each second data bus is provided with a separate transceiver which allows communication between an electronic control unit and an I/O-unit, and where the arrangement includes a programmable switch arranged between the electronic control units and the transceivers, where the programmable switch is adapted to interconnect each transceiver with a selected electronic control unit. A transceiver may be reconnected to a new ECU in an easy way, when the ECU to which the transceiver was originally connected to breaks down, which allows the new (Continued)

ECU to access the I/O-units of the broken ECU and which in turn provides an effective redundancy for the electrical control system.

13 Claims, 5 Drawing Sheets

(52) U.S. Cl.
CPC .............. *G05B 2219/24175* (2013.01); *G05B 2219/2637* (2013.01)

(56) References Cited

U.S. PATENT DOCUMENTS

| | | | | |
|---|---|---|---|---|
| 2006/0116803 | A1* | 6/2006 | Armbruster | G05B 9/03 701/48 |
| 2008/0228350 | A1* | 9/2008 | Gamulescu | H04L 12/417 701/33.4 |
| 2011/0066321 | A1* | 3/2011 | Bechtler | B60T 8/17551 701/29.2 |
| 2012/0265359 | A1* | 10/2012 | Das | H04L 12/40032 700/292 |
| 2013/0204493 | A1* | 8/2013 | Ricci | G06F 17/00 701/41 |
| 2013/0282249 | A1* | 10/2013 | Heise | B60T 13/588 701/70 |
| 2015/0346724 | A1* | 12/2015 | Jones | B60W 30/12 701/23 |
| 2017/0220035 | A1* | 8/2017 | Naoi | G05B 9/03 |

FOREIGN PATENT DOCUMENTS

| | | |
|---|---|---|
| CN | 104025514 A | 9/2014 |
| CN | 104049530 A | 9/2014 |
| EP | 0239662 A1 | 10/1987 |
| JP | H03207298 A | 9/1991 |
| JP | 2003115847 A | 4/2003 |
| JP | 2011039702 A | 2/2011 |
| WO | 2015129311 A1 | 3/2017 |

OTHER PUBLICATIONS

International Preliminary Report on Patentability (dated Jun. 13, 2017) for corresponding International App. PCT/EP2016/056560.
Chinese Official Action (dated Mar. 25, 2020) for corresponding Chinese App. 201680019531.2.
Japanese Official Action (dated Jan. 14, 2020) for corresponding Japanese App. 2017-551289.

* cited by examiner

METHOD AND ARRANGEMENT FOR PROVIDING REDUNDANCY IN A VEHICLE ELECTRICAL CONTROL SYSTEM

BACKGROUND AND SUMMARY

The present invention relates to an arrangement and a method for providing redundancy in a vehicle electrical control system, in which I/O-units connected to an electronic control unit may be selectively reconnected to any other electronic control unit in case of malfunction of the electronic control unit. The arrangement and method is especially suited for vehicle electrical control systems, in which several different electronic control units are used. The arrangement and method is however also suited for stationary electrical control systems.

The electrical control systems of modern vehicles use more and more electronics and sensor systems to control and manage the functions of the vehicle. Most of these electronic systems are Controlled by electronic control units interconnected through one or more data busses. There may e.g. be a dedicated powertrain control system comprising several electronic control units (ECU), such as an engine ECU, a transmission ECU and an injection ECU, interconnected by a dedicated high-speed data bus, which in turn can communicate with the vehicle control system through a main data bus. The main data bus transfers relevant information to the engine control systems, such as vehicle speed and acceleration input signal, and transfers relevant information from the engine control system, such as coolant temperature or engine speed.

Other electronic control units may be a control unit for a cruise control system, a rear camera system or an automated brake system. Each electronic control unit can communicate with other electronic control units in order to receive instructions and to output the status of that function. Normally, an electronic control unit is connected to a plurality of sensors adapted to input measured signals to the ECU and to a plurality of actuators adapted to perform actions initiated by the ECU. In an ABS system, a sensor may e.g. be a wheel speed sensor measuring the rotational speed of a wheel and an actuator may e.g. be a hydraulic valve adapted to act on the piston of a wheel brake in order to brake the vehicle in order to function properly, the ABS system sends information to other ECUs and receives information from other ECUs.

In order to reduce the number of electronic control units and to reduce cost, an electronic control unit is normally connected to several sensors and actuators, and may often have between 5 and 20 input and output channels or more. In order to reduce the wiring in the vehicle and to simplify the interface between the electronic control units and the sensors and actuators, the input of electronic control unit is usually based on a bus. One or more sensors and/or actuators are thus connected to an Input/Output unit (I/O-unit), which comprises a number of discrete input and output channels and a data bus interface which allows the I/O-unit to connect to other I/O-units and to the electronic control unit through a data bus, often a LIN bus or a CAN bus. An electronic control unit may thus be connected to several I/O-units.

The electronic control unit comprises a transceiver that allows the electronic control unit to communicate over the data bus. One transceiver is required for each data bus that is to be connected to the electronic control unit. Thus, an electronic control unit may comprise several transceivers adapted to communicate with the I/O-units.

FIG. 1 shows part of a common known electrical vehicle control system 100 comprising a number of separate electronic control units 102, 103, 104 interconnected with a main data bus 101. Each ECU is dedicated to a specific function of the vehicle. In one example, ECU 102 may be an Automatic Brake System Control Unit. ECU 103 may be a Vehicle Motor Control Unit and ECU 104 may be an Instrument Panel Control Unit. Each ECU is in turn connected to several sensors and actuators, either directly or through a second data bus. In the shown example, ECU 102 is connected directly to a number of wheel speed sensors 105 and brake valve actuators 106. ECU 103 is connected to a plurality of I/O-units 107 which in turn are connected to sensors and actuators used in the engine to control e.g. the ignition and injection of the engine. ECU 104 is connected to a plurality of I/O-units 108 which control e.g. the instrument cluster, the audio system, the navigation system, the information system etc.

Each ECU interchanges information with the other ECUs through the main data bus 101. The ECUs are further provided with one or more transceivers adapted to communicate with one or more I/O-units through a second data bus. Each ECU requires one transceiver per data bus in the shown example, ECU 103 and 104 are thus provided with three transceivers each. It is also possible that an I/O-unit is a sub ECU, such as sub ECU 109, which in turn is connected to other I/O-units 108 through a third data bus.

One problem that may occur in such a vehicle electrical control system is that one electronic control unit may break down or may not function properly. Depending on the importance of the electronic control unit, there are different possibilities to solve such a problem. For a very important function, such as for the engine ECU controlling the injection and ignition of the fuel, a second engine ECU may be present, which may take over when the first engine ECU fails. More likely, another ECU may take over some of the functionality of the failed ECU, and will thus provide a limited functionality of that function. Normally, such a failure will result in a malfunction of the vehicle and the vehicle control system will enter a "limp home" state, in which only a limited functionality is offered, in this case, it may e.g. be possible to drive the vehicle at a reduced speed. It is important that the sensors and actuators used by the failed ECU are also available to the ECU that takes over the duties of the failed ECU. It may thus be necessary to use a double amount of important sensors and actuators, or to provide a sensor with two outputs and an actuator with two inputs. The limited functionality of a limp home state is partly due to that some or all of the sensors that are used to control the lost function are missing, which means that even if another ECU takes over that functionality, some important input signals may be missing. The vehicle will in this case, be controlled such that all control signals will not be necessary.

When a less important electronic control unit breaks down, that functionality may be totally lost. That may e.g. be the case for a function such as electrical windows, which may not be possible to open or close. It is also possible that some functionality of the system disappears, but that the main function continuous to work. It may e.g. be possible to open or close a window, but the automatic close function will not work. The window may in this case be controlled only by holding down the window button. For an ABS system, the brakes of the vehicle will e.g. continue to work, but the ABS function may be lost.

Since it is complicated and expensive to double the important electronic control units in order to provide a redundancy in the vehicle control system, other solutions have been suggested. US 2012/0265159 A1 suggests the use of a reconfigurable interface layer, comprising reconfigurable interface devices which allow a plurality of sensors and actuators to communicate with a plurality of control units. Each sensor or actuator is connected to multiple interface devices, which in turn are connected to a bus. The control units are also connected to the bus. In the event of an interface device failure, other interface devices can be reconfigured to maintain communication between sensors, actuators and control units. In the event of a control unit failure, the interface devices can be reconfigured to route sensor and actuator message traffic to a different control unit which can handle the functions of the failed control unit.

In this system, each sensor and actuator may be routed to any electronic control which makes the system relatively complicated, and it requires an extensive reconfigurable message table and an extensive reconfigurable channel use table. In some solutions, such a system may be a step forwards and it may provide some redundancy. However, there is still room for improvements.

Further attention is drawn to US20130282249A1, disclosing an electronic controller for a brake system of a motor vehicle, which comprises at least one interface to a control element, in particular a parking brake control switch, and at least two drive circuits for electric actuators, in particular electric parking brake actuators. According to US20130282249A1, the electronic controller comprises two or a plurality of independent arithmetic units, which are directly connected to each other via a data bus.

It is desirable to provide an arrangement which provides redundancy in a vehicle electrical control system. It is also desirable to provide a method which provides redundancy in a vehicle electrical control system.

In an arrangement for providing redundancy in a vehicle electrical control system, comprising a plurality of electronic control units connected to each, other through a first data bus, and where each electronic control unit is connected to one or more I/O-units through a separate second data bus, the problem is solved in that each second data bus is provided with a separate transceiver which allows communication between an electronic control unit and an I/O-unit, and where the arrangement comprises a programmable switch arranged between the electronic control units and the transceivers, where the programmable switch is adapted to interconnect each transceiver with a selected electronic control unit.

By this first embodiment of the arrangement, the arrangement will allow a transceiver to be connected to any selected electronic control unit. Each transceiver is connected to one or more I/O-units through a suitable data bus, such as a CAN bus or LIN bus. Each I/O-unit comprises a number of input channels and or output channels to which one or more sensors and one or more actuators are connected.

During normal operation of the vehicle electrical control system, each transceiver is connected to a specified electronic control unit as is defined when initializing the arrangement (start-up of the arrangement). More specifically, one single transceiver can only be connected to one specified electronic control unit, but several different transceivers can be connected to the same specified electronic control unit. The connection of a transceiver to an electronic control unit is performed by a programmable switch, which interconnects each transceiver with the selected electronic control unit. The programmable switch is controlled such that each transceiver is connected to the selected electronic control units when the electrical control system is initialized.

The expression "the ability of the second electronic control unit to perform a functionality previously provided by a presently defective first electronic control unit", as is used, in the definition of the invention, should be understood to confer the adaptability of the arrangement to interconnect the I/O-units and the currently available electronic control units in the smartest possible way based on how still functioning electronic control units may take over functionality from a presently defective electronic control unit. Accordingly, if one of the electronic control units becomes defective, the functionality previously provided by the defective electronic control unit may be handled by remaining and still functioning electronic control units, by redirecting the information to/from the I/O-unit previously handled by the now defective electronic control unit to the still functioning electronic control units. The redirection is however based on a determination of which of and if the still functioning, electronic control units in fact may handle the information to/from the I/O-unit previously handled by the now defective electronic control unit Put differently, the programmable switch is adapted to reconnect a tranceiver from the first electronic control unit to the second electronic control unit if the first electronic control unit is faulty, based on that the programmable switch detects that a control signal from the first electronic control unit is missing, or that the programmable switch receives a reconnect control signal from the second electronic control unit. This means that when one electronic control unit is found faulty, one or more transceivers connected to that electronic control unit can easily be reconnected to another electronic control unit, which can take over the duties of the first electronic control unit. It should be understood that the expression "defective electronic control unit" may include the state where the electronic control unit becomes "faulty" or completely stops functioning. However, a defective electronic control unit may also possibly be functioning in a reduced mode where only some functionality ma be performed but where the electronic control unit is not completely faulty.

In an advantageous development of the inventive arrangement, the second electronic control unit comprises a complete set of program code adapted to perform all functionality of the first electronic control unit. In this way, the second electronic control unit can take over the complete functionality from the first electronic control unit, and since the transceiver or transceivers belonging to the first electronic control unit are reconnected to the second electronic control unit, all functions performed by the first electronic control unit can now be performed by the second electronic control unit since all sensors and actuators of the first electronic control unit will be available to the second electronic control unit.

In an advantageous development of the inventive arrangement, the second electronic control unit comprises a reduced set of program code adapted to perform a reduced functionality of the first electronic control unit. In this way, the second electronic control unit can take over some of the functionality from the first electronic control unit with the transceiver or transceivers belonging to the first electronic control unit reconnected to the second electronic control unit, it is possible to select which of the functionality of the first electronic control unit that is to be performed by the second electronic control unit. The functionality taken over from the first electronic control unit may also differ over time, depending e.g. on the amount of computing capacity that the second electronic control unit requires for its own original functionality.

In an advantageous development of the inventive arrangement, each electronic control unit of the vehicle electrical control system comprises program code adapted to perform the functionality of any of the other electronic control units. In this way, when one electronic control unit fails, any other electronic control unit can take over the functionality of that electronic control unit. It should be understood that the second electronic control unit in one embodiment may be provided for providing redundancy for the arrangement, where the second electronic control unit is in an inactive mode all the way up until when the first control, unit becomes defective, whereby the second electronic control unit takes over the functionality previously provided by the first electronic control unit. For allowing even further redundancy of the arrangement, it may in a corresponding manner be possible to also include a second programmable switch, being in a standby/inactive mode as long as the first programmable switch is functioning properly.

In an advantageous development of the inventive arrangement, each electronic control unit comprises program code adapted to perform a reduced functionality of any of the other electronic control units. In this way, it is possible to provide a limp-home function of the vehicle with a reduced functionality when one or more electronic control units fails.

In a method for providing redundancy in a vehicle electrical control system, comprising a plurality of electronic control units connected to each other through a first data bus, and where each electronic control unit is adapted to be connected to one or more I/O-units through a separate second data bus, and where each second data bus is provided with a separate transceiver, the step of initializing the vehicle electrical control system by connecting each transceiver to a selected electronic control unit with a programmable switch, thereby allowing communication between an electronic control unit and an I/O-unit, is comprised.

With the inventive method, a method in which the I/O-units required by an electronic control unit can easily be connected to a selected electronic control unit upon initializing of the vehicle electric control system is provided. The I/O-units are connected to a transceiver. Each transceiver is routed to the selected electronic control unit by the use of a programmable switch. The programmable switch further allows one or more transceivers to be reconnected to another electronic control unit, in case of e.g. a failure in one of the electronic control units. In this way, all or part of the functionality of an electronic control unit can be taken over by another electronic control unit.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of electrical control systems comprising more than one electronic control unit and a plurality of sensors and actuators, but is especially suitable for non-stationary systems comprising a plurality of dedicated electronic control units where a redundancy possibility is important.

Figure 1:
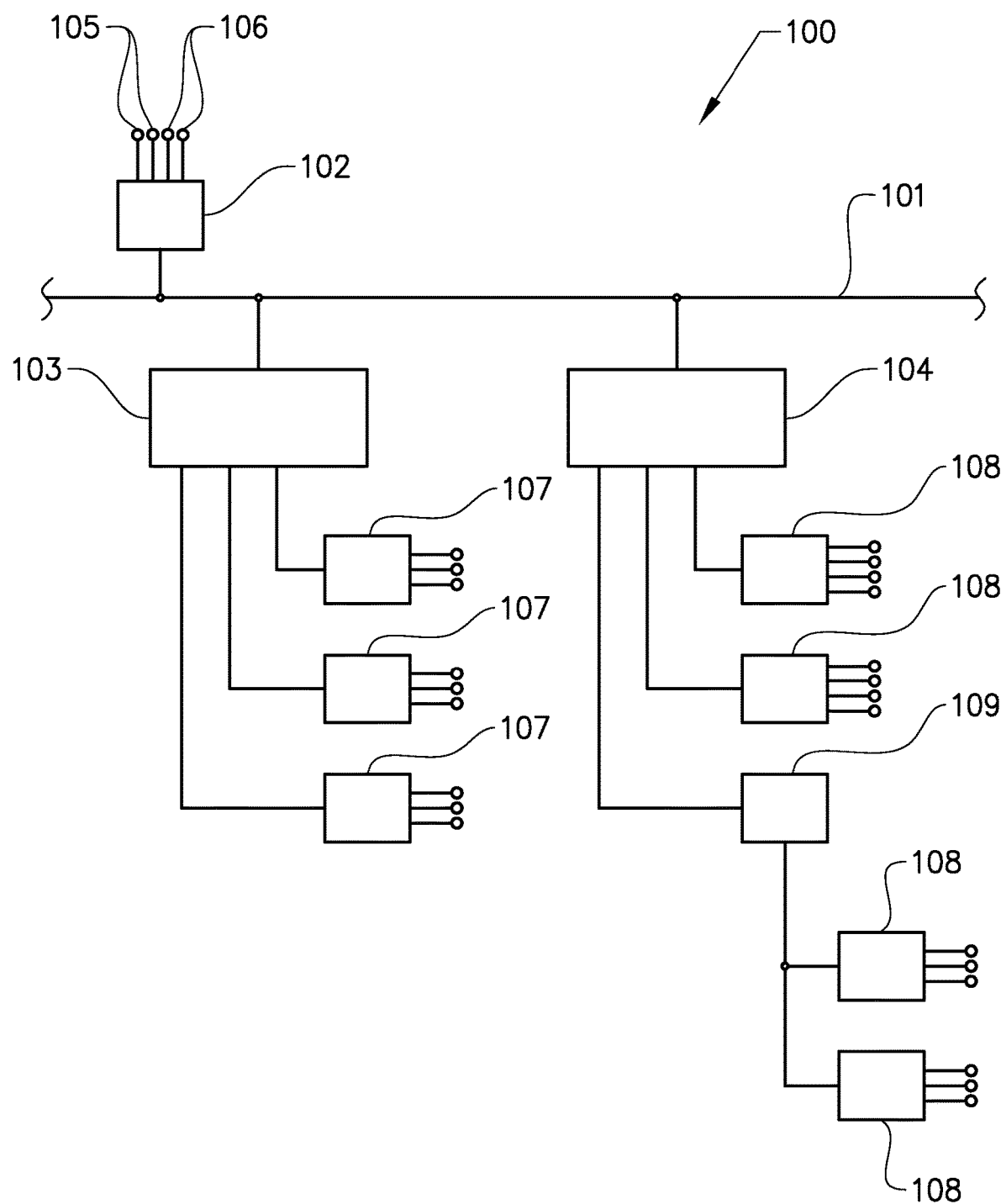
FIG. 1 shows a schematic prior art vehicle electrical control system.
Figure 2:
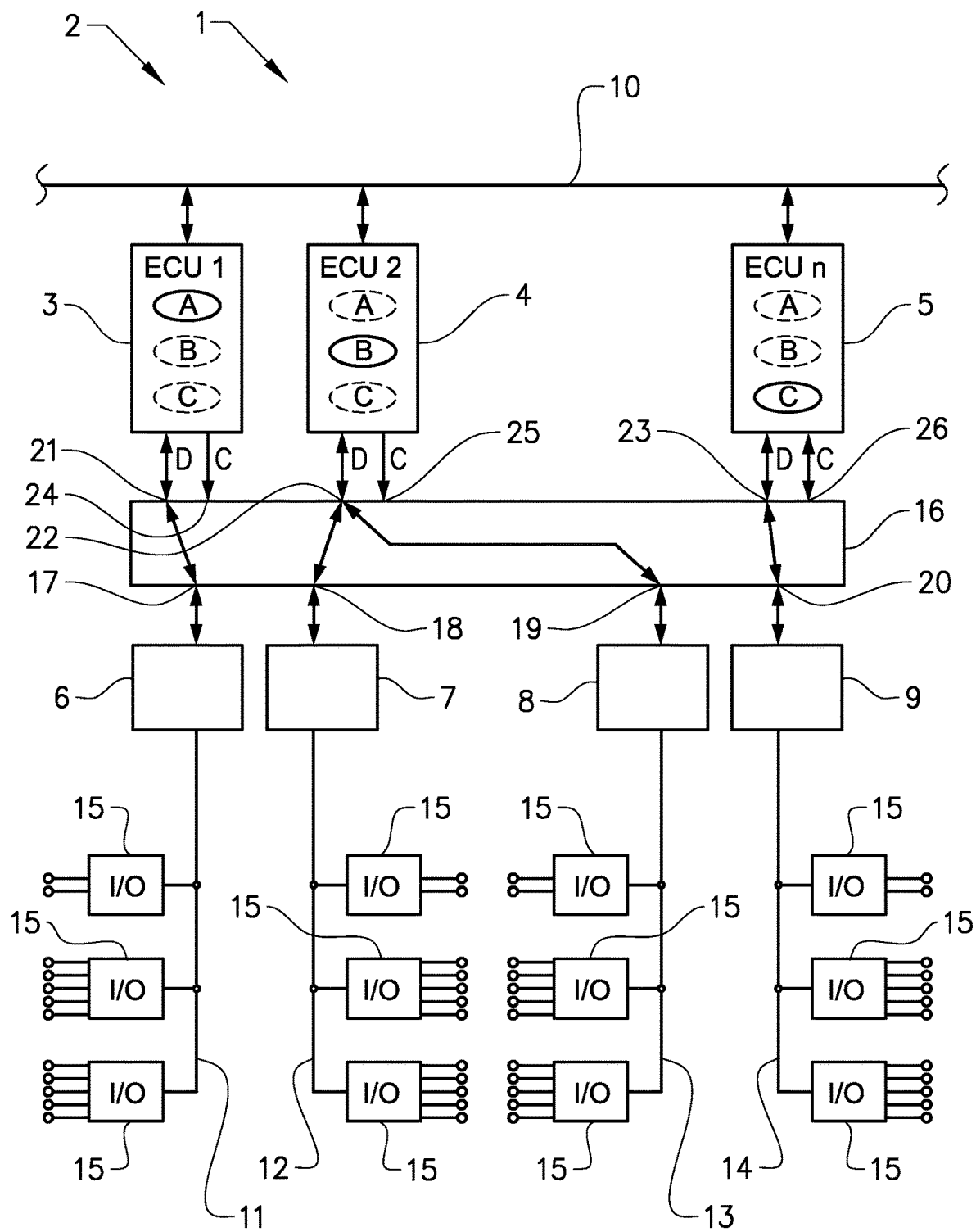
FIG. 2 shows an example of a vehicle electrical control system according to the invention.

FIG. 2 shows an arrangement 1 for providing redundancy in a vehicle electrical control system 2 according to the invention. The electrical control system 2 comprises a plurality of electronic control units connected to each other through a data bus. In the shown example, three electronic control units 3, 4, 5 are used. However, in a normal electrical control system used in a vehicle, a larger amount of electronic control units will be used. In the shown example, the electronic control units are interconnected with a first data bus 10. The electronic control units may also be connected through another, parallel data bus. The other data bus may be e.g. a data bus intended to provide redundancy if the first data bus breaks down or is damaged, or may be a specific high speed data bus used for sending high speed data between two electronic control units.

Each electronic control unit comprises program code adapted to perform specific tasks belonging to one or more functions of the vehicle. Normally, an electronic control unit is set up to represent or correspond to a specific functionality, performing specific functions and using a predefined set of sensors and actuators. This will resemble a known dedicated electronic control unit, such as an engine ECU, an ABS ECU or an infotainment ECU. At initialization of the electrical control system, each electronic control unit is assigned to a specified and predefined function. Each electronic control unit further comprises program code adapted to perform further functions of the vehicle, normally assigned to another electronic control unit. The additional program code comprised in an electronic control unit may be a complete program code corresponding to one or more functions assigned to other electronic control unit, or may be a reduced program code that is adapted to perform part of a specified function.

In the shown example, the first electronic control unit 3 comprises program code to perform function A and further comprises program code corresponding to function B and C. The second electronic control unit 4 comprises program code to perform function B and further comprises program code corresponding to function A and C. The third electronic control unit 5 comprises program code to perform function C and further comprises program code corresponding to function A and B. At initialization, the first electronic control unit 3 is set up to perform function A, the second electronic control unit 4 is set up to perform function B and the third electronic control unit 5 is set up to perform function C. The program code for the other functions will be inactivated.

In a relatively small electrical control system, it would be possible to duplicate the program code of all functions and to store it in all electronic control units. In a more complex electrical control system, such as in a modern vehicle, it is more practical to store program code for a few functions in each electronic control unit, and to vary the program code stored in each electronic control unit such that program code representing each function is stored in several electronic control units. It is also possible to reduce the program code of other functions stored in an electronic control unit, such that an electronic control unit adapted for a specified function stores a reduced set of program code for other functions.

In the shown example, the first electronic control unit 3 could thus comprise program code to perform the complete function A and further comprise reduced set of program code corresponding to a reduced function B and a reduced function C. The second electronic control unit 4 could comprise program code to perform the complete function Band further comprise a reduced set of program code corresponding to a reduced function A and a reduced function C. The third electronic control unit 5 could comprise program code to perform a complete function C and further comprise a reduced set of program code corresponding to a reduced function A and a reduced function B. The reduced sets of program code for the reduced functions will also inactivated at initialization.

Depending on the amount of required storage space, the processor capacity, etc., it is decided which electronic control unit should store which program code and the extent of the stored program code. In some systems, it would be possible to use only one type of electronic control unit for all functions, but normally, a number of different electronic control units will be used for different functions, since the requirements differ between different functions when it comes to storage space, processor capacity, bus speed, etc.

The electrical control system further comprises a large number of sensors adapted to measure signals in order to provide input signals to the electrical control system and a large number of actuators adapted to perform actions ordered by the electrical control system. In order to reduce the amount of cables and to provide a flexible system, the sensors and actuators are connected to a number of I/O-units. Each I/O-unit comprises a number of input channels for the sensors and a number of output channels for the actuators. The number of input and output channels of an I/O-unit may vary. Each I/O-unit is further provided with a data bus interface adapted for communication with an electronic control unit.

An I/O-unit communicates with an electronic control unit through a data bus. Preferably, several I/O-units communicate through the same data bus. In prior art solutions, the electronic control unit is provided with at least one transceiver acting as an interface between the data bus and the electronic control unit. In the inventive solution, the transceiver is a separate device which acts as the data bus interface, and the transceiver is not connected directly to the electronic control unit. Instead, a programmable switch 16 is used to connect a transceiver with an electronic control unit.

In the shown example, sensors and actuators are connected to I/O-units 15. The I/O-units are connected through a second data bus to a transceiver. Data bus 11 connects three ISO-units to transceiver 6, data bus 12 connects three I/O-units to transceiver 7, data bus 13 connects three I/O-units to transceiver 8, and data bus 14 connects three I/O-units to transceiver 9. It is of course possible to duplicate the second data bus such that the system uses two parallel data buses in order to provide some redundancy. With two parallel data busses, each transceiver will comprise two data bus connections. The second data bus is preferably a CAN bus or a UN bus, but other bus types are also possible.

The programmable switch 16 is adapted to connect a selected number of transceivers to predefined electronic control units at the initialization of the electrical control system. The programmable switch is electrically seen provided with a transceiver side, here referred to as the input side even though each connection is a two way connection adapted for the connection of transceivers, and an electronic control unit side, here referred to as the output side even though each connection is a two way connection adapted for the connection of electronic control units. The programmable switch is provided with one input connection for each transceiver and one output connection for each electronic control unit.

In the shown example, programmable switch 16 is provided with switch input 17 to which transceiver 6 is connected, with switch input 18 to which transceiver 7 is connected, with switch input 19 to which transceiver 8 is connected, and with switch input 20 to which transceiver 9 is connected. The programmable switch is further provided with switch output 21 to which electronic control unit 3 is connected, with switch output 22 to which electronic control unit 4 is connected, and with switch output 23 to which electronic control unit 5 is connected.

The programmable switch is further provided with one control connection for each electronic control unit, here referred to as a control input even though each connection may also be a two way connection adapted to be connected to the electronic control units, in the shown example, the programmable switch is provided with control input 24 to which electronic control unit 3 is connected, with control input 25 to which electronic control Unit 4 is connected, and with control input 26 to which electronic control unit 5 is connected.

The programmable switch is adapted to connect each transceiver to one electronic control unit. A transceiver can only be connected to a single electronic control unit, but more than one transceiver can be connected to an electronic control unit. Here, the programmable switch 16 connects transceiver 6 to electronic control unit 3, transceiver 7 to electronic control unit 4, transceiver 8 to electronic control unit 4, and transceiver 9 to electronic control unit 5. In this way, the I/O-units connected to data bus 11 will be routed to electronic control unit 3, the I/O-units connected to data bus 12 and 13 will be routed to electronic control unit 4 and the I/O-units connected to data bus 14 will be routed to electronic control unit 5.

When the system is setup up for the first time and is initialized, e.g. when the vehicle is produced, the programmable switch is set up to connect each transceiver to a selected electronic control unit. In this way, the sensors and actuators belonging to a specific function will be connected to the electronic control unit responsible for that function. The electrical control system wilt with this configuration function as a known, regular electrical control system.

If an electronic control unit breaks down or starts to malfunction in some way, the electronic control unit will not be able to perform that function in a reliable way. If the electronic control unit breaks down completely, the function will disappear, and if the electronic control unit malfunctions, the function will be corrupted. If the function is important, the vehicle will start to behave in an odd way or will stop completely.

In the inventive arrangement, the programmable switch will be able to reconnect one or more transceivers from the faulty electronic control unit to another electronic control unit, which in this way will be able to continue to perform the function of the faulty electronic control unit by using the sensors and actuators for that function.

Figure 3:
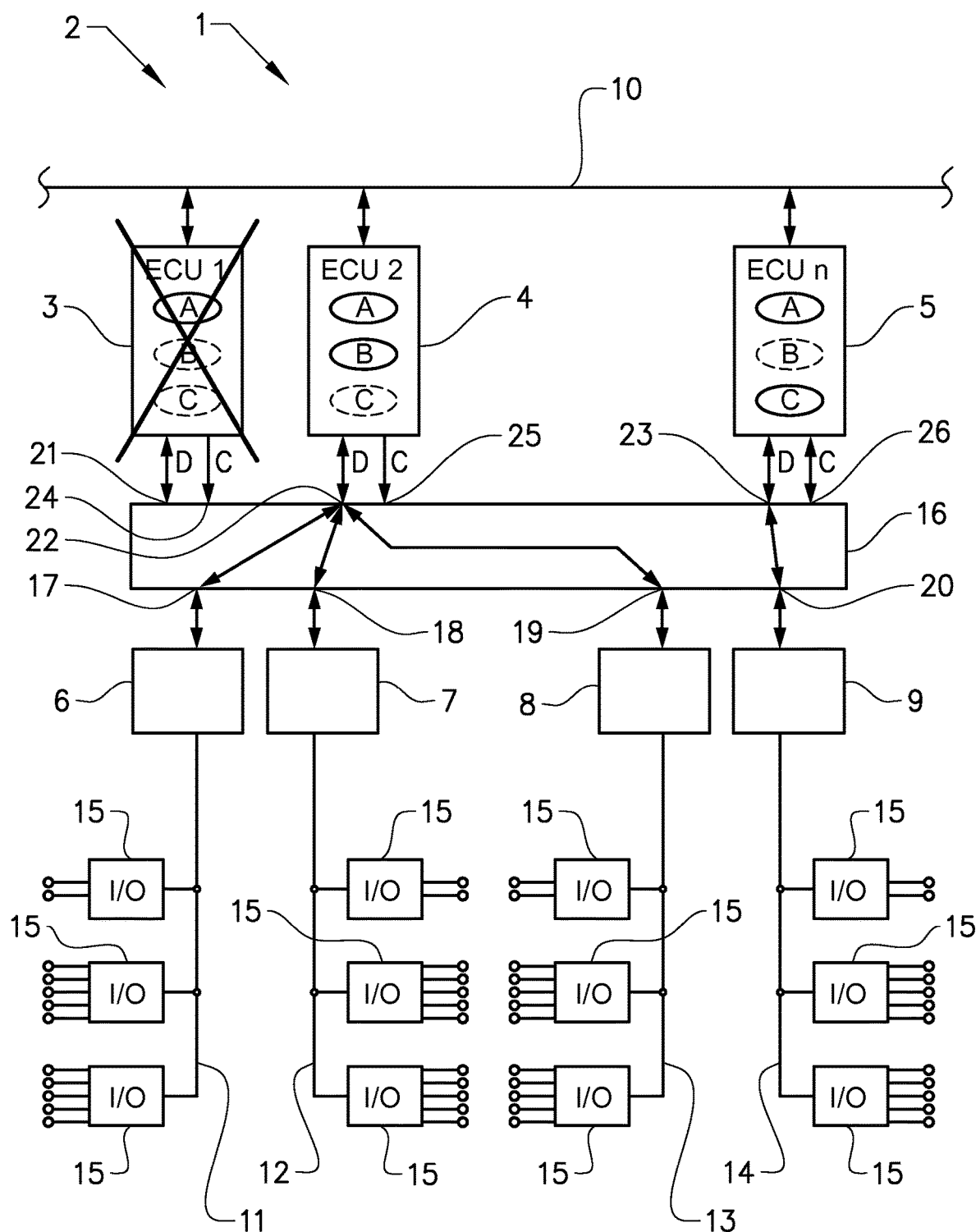
FIG. 3 shows an example of a vehicle electrical control system according to the invention with a faulty ECU.

In the example shown in FIG. 3, the first electronic control unit 3 is assumed to be faulty. Since the first electronic control unit 3 has been performing function A by using the sensors and actuators connected through data bus 11, function A can no longer be performed. The system can detect that the first electronic control unit 3 is faulty e.g. by monitoring a heartbeat signal sent out from each electronic control unit. In this case, each electronic control unit sends out a heartbeat signal on the main data bus which is monitored by the other electronic control units. When the heart beat signal for a specific electronic control unit is missing or is faulty, it is decided that this electronic control unit is faulty. Depending on which heart beat signal is missing, a selected other electronic control unit will begin to take over the duties of the faulty electronic control unit.

In the shown example, the second electronic control unit 4 will take over the duties form the first electronic control unit 3. The second electronic control unit sends a control signal to the control input 25 of the programmable switch, ordering the programmable switch to reconnect transceiver 6 to the second electronic control unit 4. The programmable switch thus reconnects transceiver 6 to the second electronic control unit 4. The sensors and actuators required by function A are now connected to the second electronic control unit 4. At the same time, the program code corresponding to function A stored in the second electronic control unit 4 will be activated, such that the second electronic control unit 4 will be able to perform also function A.

Depending on the extent of function A and also function B, the complete function A may be performed by the second electronic control unit, it is also possible that the second electronic control unit only performs a reduced function A. It would also be possible to reduce both function A and function B, if the processing capacity of the second electronic control unit cannot perform both a reduced function A and a complete function B.

In the shown example, all electronic control units comprise program code for performing all functions. However, since a vehicle normally comprises several electronic control units, in the range of 20-40 or more, it is preferred to limit the number of functions that an electronic control unit may take over. Depending on the extent of the various functions, an electronic control unit will store program code for performing at least one additional function, and a number of three to five different functions may be of advantage.

It is possible to let an electronic control unit perform more than two different functions at the same time. In the shown example, it would thus be possible to let the third electronic control unit 5 perform both function A, function B and function C, either complete or reduced, if both electronic control units 3 and 4 are faulty. However, it is preferred to let each electronic control unit take over one additional function. Should two electronic control units break down, it is preferred to let two different electronic control units take over one function each.

Figure 4:
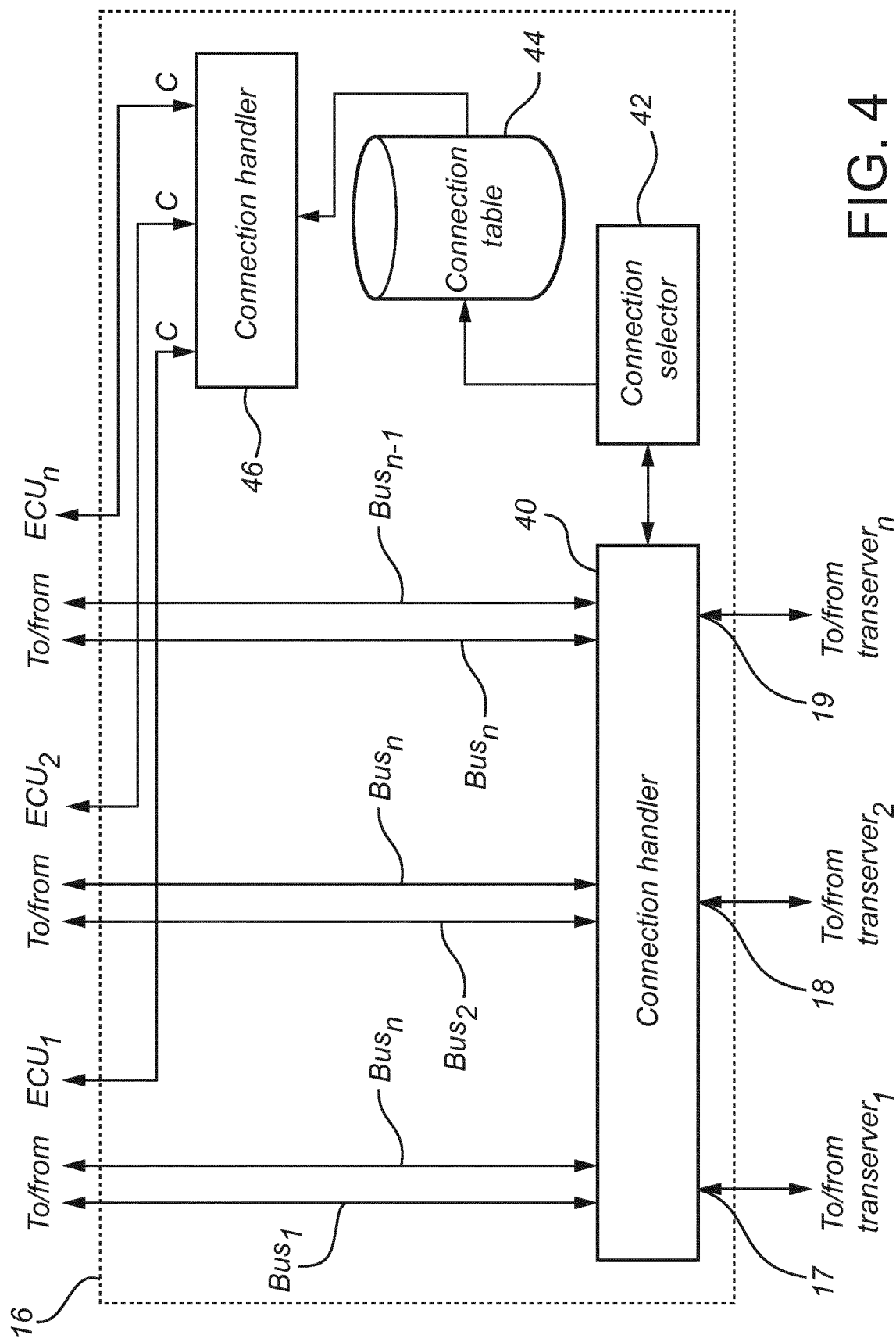
FIG. 4 shows an exemplary implementation of a programmable switch.

FIG. 4 provides an exemplary implementation of a programmable switch 16 provided in accordance to the inventive concept. In the illustrated embodiment shown in FIG. 4 the programmable switch 16 is implemented using a field programmable gate array (FPGA), allowing asynchronous, handling of the signals sent over the second, bus to and from the I/O-units 15. The programmable switch 16 may for example be implemented to comprise a first connection handles 40 adapted to (possibly asynchronously) receive/provide signals from the different transceivers 6, 7, 8, 9 of the arrangement 1 and the electronic control units 3, 4, 5. The first connection handler 40 is in turn controlled by a connection selector 42 being in communication with a connection table 44 and a second connection handler 46, where the second connection handler 46 is adapted to receive the mentioned control signals from the electronic control units 3, 4, 5, including for example heart beat signals providing an indication of the current mode of operation of the electronic control units 3, 4, 5.

Accordingly, based on the control signals received from the electronic control units 3, 4, 5, the second connection handler 46 reviews information stored within the connection table 44 on how the transceivers are connected to the electronic control units during a normal mode operation, and how they are to be reconnected in case of one of the electronic control units 3, 4, 5 becoming defective. The available information is in turned used as an input signal to the connection selector 42 for controlling the first connection handler 40.

In an advantageous implementation of the arrangement 1 the electronic control units 3, 4, 5 and the programmable switch 16 are arranged in a housing having dedicated cable interfaces for allowing connection to the second data busses 11, 12, 13, 14 using the transceivers 6, 7, 8, 9. Accordingly, one common type of housing and cable interfaces may be used for different types of vehicles. That is, the functionality as seen from "the outside" will be the same independent on what is in fact comprised within the housing. This type of implementation will greatly reduce the complexity with having to resort to different types of cable interfaces and different mounting configurations for the different types of vehicles. In addition, for different types of vehicles it may be necessary to provide different levels of redundancy. For example, a manually operated vehicle may not need the same level of redundancy as an autonomous vehicle (or semi-autonomous vehicle). Accordingly, the same housing/cable interface may be used while the hardware specification, e.g. including the number of available electronic control units, may be different for the different vehicle types.

For each different vehicle type the initialization of the arrangement may be different. For example, for the manual vehicle only a reduced redundancy is provided, meaning that in case the first electronic control unit becomes defective the second electronic control unit may only handle a selected portion of the functionality previously provided by the first electronic control unit. Conversely, in case of the autonomous vehicle the second electronic control unit is configured to be able to handle all the functionality normally provided by the first electronic control unit and may be initialized to stay in a standby/inactive mode as long as the first electronic control unit is functioning properly. If/when the first electronic control unit becomes defective the second electronic control unit becomes active and will handle all functionality previously handled by the first electronic control unit.

Figure 5:
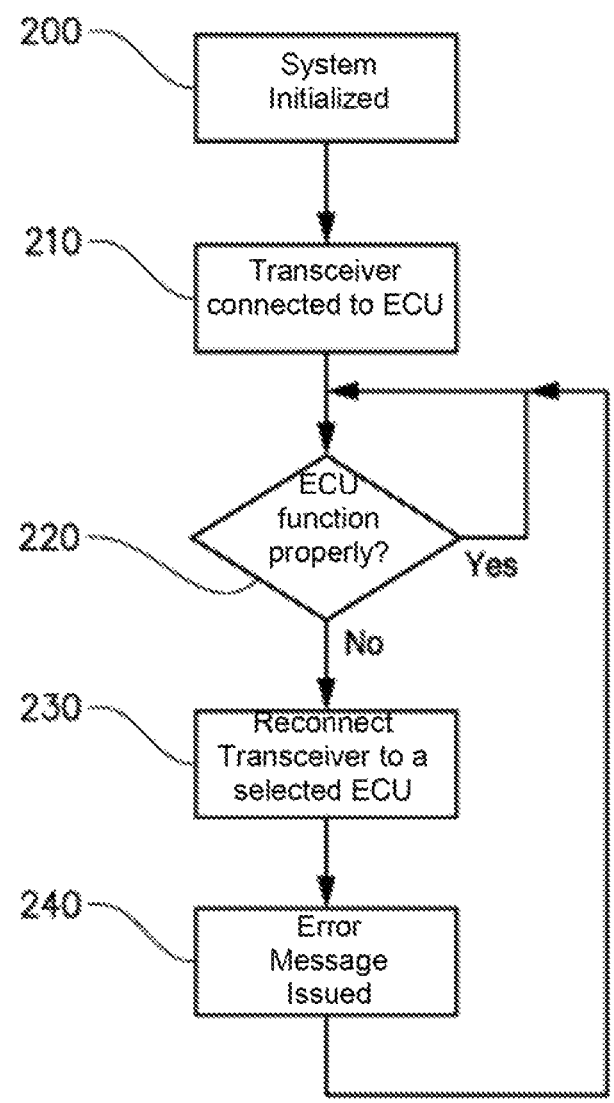
FIG. 5 shows a schematic flow chart of an inventive method for providing redundancy in a vehicle electrical control system.

With the above modular embodiment of implementing the arrangement, any service operations will be simplified as service personal need only to interact with the hosing for e.g. exchanging, a defective first electronic control unit. It should be understood that the electronic control units preferably are arranged on some form of control card, typically comprising further circuitry. The control cards may possibly be provided with means for allowing them to be fitted into a slot arranged with the housing FIG. 5 shows a schematic flow chart of a method for providing redundancy in a vehicle electrical control system, where the electrical control system comprises a plurality of electronic control units connected to each other through a first data bus, and where each electronic control unit is adapted to be connected to one or more I/O-units through a separate second data bus, and where each second data bus is provided with a separate transceiver.

In step 200, the system is initialized and program code is stored in the electronic control units. In each electronic control unit, program code adapted for performing at least two different functions is stored. The program code for a first function is activated and the program code for one or more additional functions is stored in a non-active state.

In step 210, each transceiver is connected to a selected electronic control unit with a programmable switch. The programmable switch is initialized to connect each transceiver to a predefined electronic, control unit. In this way, each electronic control unit will be able to communicate with predefined sensors and actuators through a second data bus, where the sensors and actuators are connected to one or more I/O-units.

In step 220, it is determined that all electronic control units function properly. This can be determined in different ways. In, one example, each electronic control unit sends out the mentioned heart beat signal on a first data bus, and the other electronic control units monitors this heart beat signal. When the system functions properly, the method continues to determine if the electronic control units function properly. If a faulty electronic control unit is detected, i.e. if the heart beat signal from an electronic control unit is missing, the method continues to step 230.

In step 230, the programmable switch reconnects the transceiver or transceivers belonging to the faulty electronic control unit to a selected electronic control unit. At the same time, the inactive program code corresponding to the faulty electronic control unit is activated in the selected electronic control unit. In this way, the selected electronic control unit is connected to the sensors and actuators of the faulty electronic control unit, and the selected electronic control unit will be able to perform the function of the faulty electronic control unit. The function of the faulty electronic control unit performed by the selected electronic control unit may be the complete function or may be a reduced function.

In step 240, an error message is issued. The error message may e.g., indicate that an electronic control unit is faulty, and which electronic control unit that is faulty. The error message may also indicate to a driver if there is a reduced functionality and that a service is needed. For a less important function, it may be enough to issue the error message in a data table, which will be read at the next regular service of the vehicle.

The method may then continue to step 220, where it is determined if the reconnected set of electronic control units function properly.

The invention is not to be regarded as being limited to the embodiments described above, a number of additional variants and modifications being possible within the scope of the subsequent patent claims.

REFERENCE SIGNS

1: Arrangement
2: Electrical control system
3: Electronic control unit
4: Electronic control unit
5: Electronic control unit
6: Transceiver
7: Transceiver
8: Transceiver
9: Transceiver
10: First data bus
11: Second data bus
12: Second data bus
13: Second data bus
14: Second data bus
15: I/O-unit
16: Programmable switch
17: Switch input
18: Switch input
19: Switch input
20: Switch input
21: Switch output
22: Switch output
23: Switch output
24: Control input
25: Control input
26: Control input
100: Electrical control system
101: Main data bus
102: Electronic control unit
103: Electronic control unit
104: Electronic control unit
105: Sensors
106: Actuators
107: I/O-unit
108: I/O-unit
109: Sub-ECU

The invention claimed is:

1. An arrangement for providing redundancy in a vehicle electrical control system, comprising:

at least a first and a second electronic control unit connected to each other through a first data bus, wherein the first electronic control unit is arranged to perform a functionality A and the second control unit is arranged to perform a functionality B, the functionality A being different from the functionality B, at least a first and a second transceiver each connected to one or more I/O-units through a separate second data bus, and a programmable switch arranged between the electronic control units and the transceivers and configured to selectively interconnect the first and the second electronic control unit with the first and the second transceiver, wherein the programmable switch is initialized to interconnect the first and the second electronic control unit with the first and the second transceiver, respectively, thereby allowing communication between an electronic control unit and an I/O-unit, wherein a further selective reconnection provided by the programmable switch is controlled by the first and the second electronic control unit based on a fault status of each of the first and the second electronic control unit and the ability of the second electronic control unit to perform a functionality previously provided by a presently defective first electronic control unit, the first electronic control unit is arranged to store program code corresponding to a reduced portion of functionality B and the second control unit is arranged to store program code corresponding to a reduced portion of functionality A, and wherein the fault status of each of the first and the second electronic control unit is based on a control signal received from each of the first and the second electronic control unit, wherein missing control signal from the first electronic control unit is indicative of a faulty first electronic control unit and used by the programmable switch for interconnecting the first transceiver to the second electronic control unit, the second electronic control unit is arranged to also perform at least a selected portion of the functionality A previously provided by the first electronic control unit by activating, depending on from which electronic control unit the control signal is missing, the program code stored by the second control unit corresponding to the reduced portion of functionality A.

2. The arrangement according to claim 1, wherein the second electronic control unit comprises a complete set of program code arranged to perform all functionality of the first electronic control unit.

3. The arrangement according to any one of claim 1, wherein the second electronic control unit comprises a reduced set of program code arranged to perform a reduced functionality of the first electronic control unit.

4. The arrangement according to claim 1, wherein the I/O-units are connected to the transceivers through a CAN bus or LIN bus.

5. The arrangement according to claim 1, wherein the first and the second transceivers and the programmable switch are integrated into one electronic component.

6. The arrangement according to claim 1, wherein each electronic control unit comprises program code arranged to perform the functionality of any of the electronic control units.

7. The arrangement according to claim 1, wherein each electronic control unit comprises program code arranged to perform a reduced functionality of any of the electronic control units.

8. The arrangement according to claim 1, wherein an electronic control unit comprises program code arranged to perform the functionality of a predefined number of electronic control units.

9. The arrangement according to claim 1, wherein the programmable switch comprises a field programmable gate array (FPGA).

10. A vehicle comprising an arrangement according to claim 1.

11. A method for providing redundancy in a vehicle electrical control system, the vehicle electrical control system comprising:
  at least a first and a second electronic control unit connected to each other through a first data bus,
  at least a first and a second transceiver each connected to one or more I/O-units through a separate second data bus, and
  a programmable switch arranged between the electronic control units and the transceivers and configured to selectively interconnect the first and the second electronic control unit with the first and the second transceiver, the programmable switch being controlled by the first and the second electronic control unit,
the method comprising:
  initializing the vehicle electrical control system by interconnecting the first and the second electronic control unit with the first and the second transceiver, respectively, thereby allowing communication between an electronic control unit and an ISO-unit, and
  selectively reconnecting the first transceiver with the second electronic control unit based on a fault status of each of the first and the second electronic control unit and the ability of the second electronic control units to perform a functionality previously provided by a presently defective first electronic control unit,
  wherein the first electronic control unit is arranged to store program code corresponding to a reduced portion of functionality B and the second control unit is arranged to store program code corresponding to a reduced portion of functionality A, the fault status of each of the first and the second electronic control unit is based on a control signal received from each of the first and the second electronic control unit, wherein a missing control signal from the first electronic control unit is indicative of a faulty first electronic control unit and used by the programmable switch for interconnecting the first transceiver to the second electronic control unit, the second electronic control unit is arranged to also perform at least a selected portion of the functionality A previously provided by the first electronic control unit by activating, depending on from which electronic control unit the control signal is missing, the program code stored by the second control unit corresponding to the reduced portion of functionality A.

12. A computer comprising a computer program for performing all the steps of claim 11 when the computer program is run on the computer.

13. A non-transitory computer program product comprising a computer program stored on a non-transitory computer readable medium for performing all the steps of claim 11 when the computer program product is run on a computer.

* * * * *